ary Examiner—Delbert E. Gantz

United States Patent

Kroll

[15] 3,671,597

[45] June 20, 1972

[54] ISOMERIZATION PROCESS EMPLOYING A NOVEL HETEROGENEOUS CATALYST

[72] Inventor: Wolfram R. Kroll, Somerville, N.J.
[73] Assignee: Esso Research and Engineering Company
[22] Filed: July 17, 1970
[21] Appl. No.: 55,965

Related U.S. Application Data

[63] Continuation-in-part of Ser. No. 674,709, Oct. 10, 1967, Pat. No. 3,536,632.

[52] U.S. Cl. ..................................260/666 PY, 260/683.2
[51] Int. Cl. ........................................C07c 5/24, C07c 13/28
[58] Field of Search ................................260/666 PY, 683.2

[56] References Cited

UNITED STATES PATENTS

| | | | |
|---|---|---|---|
| 3,377,398 | 4/1968 | Zoche | 260/666 PY |
| 3,535,395 | 10/1970 | Schneider | 260/666 PY |
| 3,535,396 | 10/1970 | Schneider | 260/666 PY |
| 3,538,171 | 11/1970 | Schneider | 260/666 PY |
| 3,439,054 | 4/1969 | Kroll | 260/680 |
| 3,514,497 | 5/1970 | Hughes | 260/680 |
| 3,586,726 | 6/1971 | Atkins et al | 260/666 PY |

*Primary Examiner*—Delbert E. Gantz
*Assistant Examiner*—Veronica O'Keefe
*Attorney*—Chasan and Sinnock and D. C. Caulfield

[57] ABSTRACT

Aliphatic and cyclic mono-olefins, diolefins, and polyolefins are isomerized by contacting an organic feed containing said olefinic compounds with a heterogeneous conversion catalyst prepared by forming, in an inert atmosphere, complexes between a reduced transition metal and a support and thereafter stabilizing the complex by heating at elevated temperatures. The complex is formed by impregnating a suitable catalytic support material with a solution of a soluble Group IVB through VIIB and Group VIII transition metal; reducing the impregnated support with an organometallic reducing agent at a temperature of about ambient to about 60° C.; removing excess solvent and excess reducing agent, and thereafter heating the product at a temperature of 100° C. to about 600° C. under substantially anhydrous conditions.

17 Claims, No Drawings

ISOMERIZATION PROCESS EMPLOYING A NOVEL HETEROGENEOUS CATALYST

CROSS-REFERENCE TO RELATED APPLICATIONS

This application is a continuation-in-part of U.S. Ser. No. 674,709 filed Oct. 10, 1967, entitled "Heterogeneous Catalysts" now U.S. Pat. No. 3,536,632 issued Oct. 27, 1970.

FIELD OF THE INVENTION

This invention relates to the preparation and use of novel heterogeneous conversion catalysts to isomerize aliphatic and cyclic mono-olefinic, diolefinic and polyolefinic compounds. More particularly, this invention relates to the use of heterogeneous catalysts, which catalysts are believed to contain stable complexes comprised of a reduced transition metal and a support, in isomerization reactions. In a preferred embodiment of this invention, 5-alkenyl bicyclo(2.2.1) hept-2-enes are isomerized to 5-alkyldiene bicyclo(2.2.1)hept-2-enes by contacting an organic feed stream containing 5-alkenyl bicyclo(2.2.1)hept-2-enes with a stable complex formed by impregnating a suitable catalytic support material with a nonaqueous solution of a soluble Group IVB–VIIB and Group VIII transition metal compound; reducing the impregnated support with an organometallic reducing agent at a temperature of from about ambient to about 60° C.; removing excess solvent with an excess reducing agent and thereafter stabilizing the complex by heating the reduced impregnated support at a temperature of from about 100° C. to about 600° C., the process being effected in an inert atmosphere under anhydrous conditions.

DESCRIPTION OF THE PRIOR ART

Various heavy metals, particularly transition metals and including noble metals, have been previously described as useful for conducting catalytic reactions. For example, hydrocarbon conversion catalysts have included solid metals, slurries of metals, metals dispersed on supports, etc. Supported metal catalysts have been prepared by impregnating a support with a salt solution of the desired metal, followed by reduction of the salt, normally in a hydrogen atmosphere at relatively high temperatures, e.g., 900°–1,000° F. However, hydrogen reduction has serious drawbacks in that the required high temperatures often cause sintering of the support material and severe reduction of the surface area of the support, resulting in a rapid loss of activity of the catalyst. Additionally, if water solutions are employed to impregnate the support, a calcining operation is necessitated, prior to reduction, which may also lead to reduced surface area and further loss of catalytic activity.

It has recently been proposed, however, to prepare supported hydrocarbon conversion catalysts by reducing a metal soap, e.g. cobalt, molybdenum, or manganese soaps, with an aluminum hydrocarbonyl reducing agent, and impregnating a support with the reduced soap. In this manner, a loosely supported metal can be made somewhat more active for conversion reactions; see Canadian Pat. No. 697,780. Nevertheless, significant disadvantages remain with such systems. Thus, for example, relatively high hydrogen pressures, e.g., about 800 psig are required for the hydrogenation (reduction) of organic unsaturation, and the reactions are of necessity limited to the liquid phase. Additionally, the catalysts prepared in Canadian Pat. No. 697,780 are finely divided, highly pyrophoric materials which must be prepared and used in oxygen-free, anhydrous atmospheres. Furthermore, the single step of reducing and heat treating the catalysts in Canadian Pat. No. 697,780 results in a different complex than that formed by the process of this invention.

In addition, various methods have been described in the art for isomerizing aliphatic and cyclic olefins, diolefins and polyolefinic compounds. For example, in U.S. Pat. No. 3,347,994, various base-catalyzed processes for isomerizing 5-alkenyl bicyclo (2.2.1)hept-2-enes to 5-alkyldiene bicyclo (2.2.1)hept-2-enes are described. These processes involve contacting the 5-alkenyl bicyclo compounds with either (a) a high surface alkali metal such as sodium dispersed on alumina; (b) a combination of a strong base of an alkali metal and a dipolar aprotic solvent or (c) an alkali metal amide in combination with a nitrogen base having at least one hydrogen atom in order to isomerize 5-alkenyl bicyclo compounds to 5-alkyldiene bicyclo isomerization products.

It has now been discovered, however, that highly stable complexes of reduced transition metals and supports may be formed at low or moderate temperatures, these complexes being useful in both liquid and gas phase reactions, particularly as catalysts for isomerization reactions. Since reduction of the transition metal is effected by an organometallic reducing agent, high temperature hydrogen reduction is not necessary, and, since nonaqueous solutions are employed, calcining is also eliminated. Thus, two major disadvantages of prior art catalysts are overcome.

SUMMARY OF THE INVENTION

In accordance with this invention, therefore, highly stable complexes between support materials and reduced transition metals are formed by reacting under an inert atmosphere and under anhydrous conditions, a support material, a nonaqueous soluble transition metal compound, and a nonaqueous soluble organometallic reducing agent, the latter acting to reduce, or activate, the transition metal; and, stabilizing the complex by heating. The complex may be formed in several different ways, to wit: (i) the transition metal compound is reduced in a nonaqueous solution by an organometallic reducing agent followed by impregnation of the support with the solution of the reduced transition metal; (ii) the support is impregnated first with the organometallic reducing agent and then with the nonaqueous solution of the transition metal compound; and (iii) the support is impregnated with a solution of the transition metal compound and then reduced, or activated, by the organometallic reducing agent, the latter method being a particularly preferred method for preparing the novel catalysts of this invention. In any case, however, the complex is then stabilized by heating the impregnated and activated product.

While not wishing to be bound by any particular theory, it is believed that highly tenacious chemical bonds are formed between the reduced transition metal and active sites on the support. Thus, the catalytic material prepared herein differs from simple supported catalysts where only physical bonds between the metal and the support are believed to exist. The new catalyst which is believed to contain a stable complex between the reduced metal and the support may or may not contain some reducing agent, i.e., in a complex bond. Additionally, while stabilizing temperatures are often high enough to cause sintering of the catalyst, it is believed that the reduced transition metal is spaced far enough apart, e.g. because of spacings caused by the organic ligand, that sintering unexpectedly does not occur.

Thus, novel conversion catalysts are prepared which are particularly useful and selective as isomerization catalysts, but may also be used to promote such conversions as dehydrogenation, reforming, hydrocracking, desulfurization, aromatization, dimerization, Fischer-Tropsch synthesis, ammonia synthesis, etc., as is disclosed in copending application U.S. Ser. No. 793,887, filed Jan. 20, 1969. In addition, the catalysts of this invention are effective as olefin disproportionation catalysts as well as in exhaust gas conversion and in the decomposition of nitric oxide.

Generally, the transition metals applicable to this invention are selected from Groups IVB–VIIB and GROUP VIII of the Periodic Chart of the Elements. Thus, transition metal compounds wherein the metal may typically be titanium, zirconium, vanadium, chromium, molybdenum, tungsten, manganese, iron, cobalt, nickel, and the platinum group metals, i.e., platinum, palladium, rhodium, ruthenium, iridium, and osmium may be employed. Of the foregoing, the Group VIII metals are generally preferred. Thus, iron, cobalt, and nickel are preferred Group VIII base metals, while platinum, palladium, and rhodium are preferred Group VIII noble metals. Still more preferred, however, are iron, cobalt, nickel, and platinum, while most preferred are iron, cobalt and nickel, and yet still more preferred is cobalt.

The anionic component of the transition metal compound is not critical and it is essential only that the resulting compound be soluble in nonaqueous solvents. Therefore, since nonaqueous solvents can be both polar and nonpolar, the anionic component of the compound may similarly come from a polar or nonpolar compound. Typical examples of anionic components are $SiF_6-$, cyanides, azides, halides, e.g., chlorides, bromides, etc. However, organic salts such as result from weak organic acids, e.g., acetates, propionates, butyrates, valerates, etc., stearates, laurates, oleates, and other fatty acid radicals; salts of alcohols, e.g., butanols, hexanols, octanols, glycols, eicosanols, cyclodecanols, etc.; alkoxides e.g., ethoxides, benzoates, etc., are preferred. Particularly preferred organic components are the oxygen base chelates, because of their solubility and drying characteristics, in which the donor atoms are oxygen or oxygen and nitrogen, preferably oxygen, and which are fully described in Martell and Calvin, *Chemistry of the Metal Chelate Compounds*, Prentice Hall, Inc. (1952), typical examples of which are: acetylacetonates, salicylaldehydes, dimethyl dioxime derivatives, tropolonates, and the like. Most preferred are the acetylacetonates.

The organometallic reducing agent which is used herein to activate the transition metal can generally be described by the formula $MR_n$ wherein M is a metal selected from Group I, II, or III, more preferably Group IA, IIB, or IIIA of atomic number 3 to 30; R is a monovalent organo, e.g., halide, alkoxy, etc.; hydrogen; or, hydrocarbyl radical; and $n$ is an integer from 1 to 3 and equal to the valence of M. More specifically, R may be the same or different, substituted or unsubstituted, saturated or unsaturated, but is preferably hydrocarbyl in nature, e.g., alkyl, aryl, alkaryl, aralkyl, cycloalkyl. Such groups include, for example, methyl, ethyl, n-propyl, isopropyl, isobutyl, sec-butyl, tert-butyl, n-amyl, isoamyl, heptyl, n-octyl, n-dodecyl, and the like; 2-butenyl, and the like, cyclopentylmethyl, cyclohexyl-ethyl, cyclohexylpropyl, and the like; 2-phenyl ethyl, 2-phenyl propyl, 2-naphthyl ethyl, methyl naphthyl ethyl, and the like; cyclopentyl, cyclohexyl, 2,2,1-bicycloheptyl, and the like; methyl cyclopentyl, dimethyl cyclopentyl, ethyl cyclopentyl, methyl cyclohexyl, dimethyl cyclohexyl, 5-cyclopentadienyl, and the like; phenyl cyclopentyl, and the like; phenyl, tolyl, xylyl, ethyl phenyl, xenyl, naphthyl, cyclohexyl phenyl, and the like. In general the R group can contain up to about 20 carbon atoms and M may be selected from such metals as lithium, magnesium, calcium, strontium, zinc, cadmium, boron, and aluminum.

Preferred reducing, or activating agents are aluminum derivatives of the formula $AlR'_3$ wherein R' is selected from the group consisting of hydrogen and $C_1-C_{20}$ hydrocarbyl radicals, including oxyhydrocarbyls, e.g., alkoxides, preferably alkyl radicals, wherein at least one R' is a hydrocarbyl radical. More preferably tri-alkyl substituted aluminum is employed as the reducing agent. Of these alkyl radicals of one to 12 carbon atoms are most preferred and those radicals with a decreasing number of carbon atoms are still more preferred. Thus, compounds such as triethyl aluminum, diethyl aluminum hydride, propyl aluminum dihydride, triisobutyl aluminum, tri-n-hexyl aluminum, etc., may be employed. The most preferred compound, which appears to give the best catalyst is, however, trimethyl aluminum. It is particularly important that the solvents and transition metal compounds be substantially and preferably completely, free of water since water can cause hydrolysis of the reducing agent, thereby inhibiting or destroying its reducing potential.

It is essential that the reaction occur under nonaqueous or anhydrous conditions; by anhydrous conditions is meant that no more than 1 percent water by weight based on feed may be tolerated in the reaction zone. Thus, the components, i.e., transition metal compound, reducing agent, are generally employed as solutions in nonaqueous solvents. The applicable solvents may then be generally characterized as nonaqueous organic solvents and may be both polar or nonpolar and will not boil off at the temperatures employed. Among the solvents that may be employed are $C_1-C_{20}$ amines, $C_1-C_{20}$ alcohols, ethers, e.g., diethyl ether, dioxane, tetrahydrofuran, alkyl and aryl ethers, both symmetrical and unsymmetrical, and the like; ketones, e.g., acetone, methyl ethyl ketone, methyl isobutyl ketone, and the like; organic halides, e.g., methyl chloride, ethyl chloride, chloroform, and the like; paraffins, cycloparaffins, and isoparaffins, e.g., $C_5-C_{20}$ saturated hydrocarbons, such as pentane, hexane, isooctane cyclohexane, decane, dodecane, cyclododecane, and the like; aromatics, e.g., $C_6-C_{20}$ aromatics, such as benzene, xylene, toluene, durene, ethyl benzene, and the like. Of these solvents, however, the paraffins and aromatics are preferred, and the paraffins are most preferred, particularly the n-paraffins. These solvents are used both for the components and as reaction media in catalyst preparation.

The stable complex which gives rise to the increased activity of these catalysts is believed to be formed between the transition metal and a suitable support. Generally, the supports applicable to this invention are those which are or could be used as catalytic support materials. Thus, suitable supports are the oxides of Group II, III, IV, V and VIB metals of the Periodic Chart of the Elements, although the oxides of Group II, IIIA, and IVB metals are preferred, e.g., zinc oxide, magnesia, calcium oxide, strontium oxide, barium oxide, titania, zirconia, vanadia. The Group IIIA metal oxides, particularly boria and alumina, are especially preferred. Alumina supports, in fact, are quite outstanding from a cost effectiveness viewpoint, are readily available and are most preferred. Combination supports, e.g., silica alumina, are also effective and of a preferred nature. In addition, such common support materials as clays, both natural and synthetic, e.g., attapulgite clays, diatomaceous earths, e.g., kieselguhr, silica, carbon, e.g., activated carbon, coke, charcoal, graphite and graphite forms such as furnace black, channel black, alkali graphites, etc., molecular sieves, both X- and Y-type, and the like.

The method used to deposit the transition metal onto the support is somewhat critical in that the activity of the catalyst will be dependent to some extent on the manner in which the catalyst is prepared. In all of the following procedures any conventional liquid-solids contacting techniques and apparatus can be employed. In the preferred embodiment for preparing novel catalysts useful as hydrogenation catalysts, the support is first impregnated with a nonaqueous solution of a transition metal salt, e.g., cobaltic acetylacetonate in benzene. Excess solvent is driven off by heating, e.g., to about 150° C. or by vacuum, or both or may remain to be driven off after activation (reduction). A solution of the reducing, or activating agent, e.g., trimethyl aluminum, is then added to the impregnated support. The activation reduction step, in which the transition metal is reduced to a lower or zero valence state may take a few minutes, e.g., 5 minutes to a few hours, e.g., 10 hours, depending upon the temperatures that are employed, i.e., this reaction occurs with a time-temperatures relationship in which increasing temperatures decrease reaction times. The foregoing treating steps, i.e., impregnation with transition metal salt solution, activation with reducing agent, solvent removals, are normally conducted at temperatures ranging from about −60° to 150° C., preferably ambient to 60° C. Atmospheric pressure is advantageously employed but pressures are not generally critical. Of course, pressures may be lowered during solvent removal or drying steps to aid in those procedures. After the reduction/activation, excess reducing agent and solvent are removed by heating or in vacuum or both. The heating may be within the temperature ranges previously mentioned. It is necessary to insure removal of all excess reducing agent, since this component can act as a catalyst poison to reduce or destroy catalytic activity. The reducing agent can be removed by any techniques, e.g., vacuum removal, heating, washing, etc.; however, the support is preferably washed one or more times with a nonaqueous solvent for the reducing agent, e.g., those previously mentioned but preferably the same one used to apply the reducing agent. The catalyst is then stabilized, i.e., the strong bonds between transition metal and support are formed, by heating in the inert atmosphere wherein all volatile components are driven off. Thus, such inert gases as hydrogen, nitrogen, helium, argon, carbon dioxide, mixtures thereof, and the like may be employed. Generally, the catalyst is heated to about 100° – 600° C., e.g., 300° – 600α C., but at least above 100° C., for up to about 24 hours, but at least for about 0.1 hours, preferably about 0.1 to about 4 hours, more preferably about ½ to 1 hour, e.g., 1 hour. If the catalyst is to be used in isomerization reactions, it is preferably heated in a hydrogen atmosphere. Additionally, it is normally only necessary to stabilize the catalyst at temperatures slightly above, e.g., 10° – 50° C., the temperature of its intended use. After stabilization the catalyst is ready for use or may be stored at ambient conditions.

In another but less preferred embodiment, the reducing agent, in a nonaqueous solution, is first impregnated or anchored on to the support, excess solvent and reducing agent removed as previously described, and the solution of the transition metal compound added, reduction/activation being effected, and excess solution removed. The conditions for treatment and reduction are those as previously described. Stabilization is then effected in the manner described above. In this method, it is essential to remove excess reducing agent prior to treatment with the transition metal salt since it is believed that excess reducing agent poisons the activity of the reduced transition metal-support complex.

In yet another embodiment, the catalyst may be formed by preparing a homogeneous solution of a transition metal compound and a reducing agent wherein the reduction takes place, followed by impregnation of a support with this solution, removal of excess solution, and stabilization. The homogeneous solution may be prepared under the aforementioned conditions and is described in U.S. Pat. No. 3,323,902. However, when preparing such solutions, the molar ratio of aluminum to transition metal should be in excess of 1/1 in order to achieve complete activation, but is preferably 1/1 to 10/1, more preferably 1/1 to 6/1. Similar ratios should be used in the foregoing preparations since, as mentioned, it is believed that the reducing agent tends to inhibit the activity of the catalyst at ratios above those given here. Thus, in the first reported method for preparing the catalyst, the reducing agent should be added to the transition metal compound impregnated support in the ratios shown, while in the second method enough transition metal compound is added to the reducing agent impregnated support to obtain the desired ratios. (The amount of reducing agent impregnated is easily calculated by measuring the initial solution and the excess that is removed.) During the preparation of the catalyst, in all cases described, the various steps should be carried out under an inert atmosphere, i.e., essentially in the absence of oxygen and moisture, for example, under a nitrogen, helium, CO₂, argon, etc., blanket. However, when the stable catalyst is prepared, it appears to be more stable at ambient conditions than conventional supported catalysts such as those in Canadian Pat. No. 697,780.

Generally, the methods for preparing the catalysts disclosed herein are useful for depositing about 0.01 to 20, preferably 0.1 to 10 weight percent metal on the support. Moreover, in the case of platinum group metals, this procedure is particularly desirable since low metal concentrations can be deposited onto the support and have shown excellent catalytic activity; consequently the cost of the catalyst can be reduced over conventional supported precious metal catalysts.

In another embodiment of this invention, more than one transition metal may be reduced and, therefore, a supported catalyst of two or more metals may be prepared. Such catalysts are of particular importance for (i) reducing catalysts costs by using a less expensive second metal; (ii) making poison-resistant catalysts by coreducing a scavenger; and (iii) preparing novel alloy compositions on a support.

For example, a cobalt/platinum catalyst (Co:Pt=10:1) may be prepared wherein the cobalt acts as a scavenger for poisons, e.g., sulfur containing molecules while the platinum site is not poisoned and can, in contact with hydrogen, help regenerate the poisoned cobalt sites. A particularly valuable catalyst that is prepared in this way is a cobalt-chromium supported catalyst useful for the aromatization of feedstocks containing sulfur even in large amounts. Other combinations include cobalt-tungsten, cobalt-platinum and nickel-rhenium. The advantages of such bimetallic systems are readily apparent in that they are more poison-resistant than conventional ones. Additionally, because of their novel, alloy type of composition, they show increased conversions and improved selectivity compared with commercial catalysts. Coreductions or multireductions are effected under the same conditions as previously described except that the molar ratios described will now be that of aluminum, or other reducing metal, to total transition metal.

The catalysts described herein may be generally characterized as useful for promoting the isomerization of olefinic compounds, preferably cyclic mono-, di-, and poly-olefins. The olefinic compounds that may be employed will, of course, encompass a variety of feeds that are well known to those skilled in isomerization reactions. These compounds preferably contain from two to about 30 carbon atoms and, in addition to carbon and hydrogen, may also contain such elements as oxygen and nitrogen. Preferably, the compounds are essentially hydrocarbon in nature. In any event, the catalysts may be used as slurries or as fixed beds, movable beds, and fluidized beds, in liquid phase and vapor phase reactions, batch, continuous, or staged operations.

Isomerization reactions can be effected with higher selectivity than with conventional supported catalysts. Generally, isomerization reactions can be conducted at temperatures ranging from about ambient to 300° C., preferably 100° to about 200° C. and at a pressure in the range of from below atmospheric to 500 psi, preferably atmospheric to 50 psi. The catalyst is generally present in catalytic amounts, e.g. about 0.1 mol percent based on feed or larger at feed rates ranging from about 0.1 to 10 V/V/hr. e.g., up to about 80 percent preferably about 1 to 40 percent.

The organic compounds which are isomerized in accordance with the instant invention are aliphatic and cyclic monoolefins, diolefins and polyolefins having from about two to about 20 carbon atoms. Preferably, terminal aliphatic olefins having from two to about 10 carbon atoms are isomerized to internal olefins; aliphatic di- and polyolefins having from two to about 10 carbon atoms are isomerized to conjugated diolefins, and cyclic di- and polyolefins having from two to about 10 carbon atoms are isomerized to conjugated systems by the catalyst system disclosed herein. Representative, non-limiting examples of such olefinic isomerizations include: butene-1 to butene-2, hexene-1 to hexene-2 and hexene-3, 4-vinylcyclohexene-1 to 3-ethylidenecyclohexene-1, 4-phenyl-butene-1 to 1-phenylbutene-1, 1.5-cyclooctadiene to 1.3-cyclooctadiene and the like.

Preferably, the cyclic diolefins which are isomerized in accordance with the process of the instant invention are 5-alkenylbicycloheptenes, which are represented by the general formula:

wherein X is an alkenyl radical having from two to about six carbon atoms and Y is hydrogen or an alkyl radical having from one to about four carbon atoms. More preferably, X is a straight-chained alkenyl radical having from about two to about three carbon atoms and Y is hydrogen. More preferably, X is vinyl and Y is hydrogen. Representative, non-limiting examples of 5-alkenyl bicyclo heptenes include: 5- vinyl bicyclo[2.2.1] hept-2-ene, i.e., vinylnorbornene, 5-propenyl bicyclo [2.2.1]hept-2-ene and the like. The above-described 5-alkenylbicycloheptenes are isomerized by the catalyst system herein described to 5-alkylidenebicycloheptenes, i.e., 5-vinyl bicyclo [2.2.1] hept-2-ene to 5-ethylidenebicyclo [2.2.1] hept-2-ene (ethylidene-norbornene), which compounds are useful as the terpolymer in the ethylene-propylene-terpolymer type rubbers.

The isomerization of the above-identified organic compounds is normally conducted in an inert solvent which may correspond to any of the solvents mentioned above for preparing catalysts. After a suitable length of time, the isomerization catalyst of the instant invention may become deactivated such that there is a loss in conversion and selectivity to the desired isomerized product. The catalyst may then be regenerated by treatment with hydrogen at a temperature in the range from about ambient to about 400° C. and most preferably at a temperature of about 50° C. to about 250° C. for a period of time in the range of from about 0.02 to about 24 hours in order to restore the activity of the catalyst. Thus, while the isomerization reactions of the instant invention are normally carried out in the substantial absence of a hydrogen atmosphere, minor amounts, i.e., from about 0.001 to about 1 percent hydrogen can be tolerated in the reaction zone.

Having now described this invention, further illustrations are shown in the following examples. However, no limitations are to be implied for these examples over and above those contained in the claims appended hereto, since variations and modifications will be obvious to those skilled in the art.

EXAMPLE 1

Twelve grams of Alcoa F-1 alumina was contacted with a solution of 8.54 grams of cobalt-acetyl-acetonate in 100 ml. benzene. Subsequently, the benzene was removed in vacuo. The dry supported cobalt chelate was then screened to obtain 10 × 20 mesh material. 14.5 grams of this 10 × 20 mesh material was then contacted with a solution of 8.35 grams of trimethyl aluminum in 232 ml. of benzene. The reduction was carried out between ambient and 60° C. (but below the boiling point of the solvent) over a period of several hours. After the reduction the solvent was then removed, e.g., by evacuation, the dry catalyst was then washed twice with an aliphatic solvent, namely 50 ml. of pentane, after which all solvent and excess $(CH_3)_3Al$ is removed. The catalyst was subsequently activated by heat treatment as described in Example 2.

EXAMPLE 2-5

Isomerization of Vinylnorbornene 9.5 ml. (9.8 g.) of the catalyst prepared in accordance with Example 1, containing 7.9 weight percent cobalt on alumina, was heat treated in a microreactor at 130° C. for 1 hour using helium as inert gas. Subsequently a 10 percent weight solution of vinylnorbornene in hexane was pumped into the microreactor at a feed rate of 9.5 ml./hr. for a period of 1 hour. During this operation a helium flow of 10 ml./min. was maintained. The effluent was clear, colorless. Analysis by gas chromatography gave the following results:

TABLE I

Isomerization of Vinylnorbornene

| Run No. | Reactor Temp. | Feed Rate[a] | Conversion (%) | Selectivity[b] (%) |
|---|---|---|---|---|
| 2 | 150°C. | 9.5 ml/hr | 43 | 90 |
| 3 | 170°C. | 9.5 ml/hr | 84 | 73 |
| 4 | 190°C. | 9.5 ml/hr | 94 | 60 |
| 5 | 200°C. | 9.5 ml/hr | 93 | 54 |

[a]Feed: 10% (weight) vinylnorbornene in hexane.

[b]Selectivity to ethylidenenorbornene.

EXAMPLE 6

Hydrogen Regeneration of Catalyst

After numerous runs the activity of the catalyst as described in Example 2 decreased to give only 23 percent conversion and 99 percent selectivity at 130° C. After a hydrogen treatment for 1 hour at 130° C. (60 ml./min.) followed by helium treatment (1 hr., 130° C.) another isomerization of vinylnorbornene was carried out at 130° C. (using the same conditions as in Run 2). A substantial increase in conversion was noted: 51.4 percent (selectivity 99 percent while no loss of selectivity to ethylidenenorbornene could be detected.

EXAMPLES 7-9

Butene-1 Isomerization

The supported cobalt catalyst was prepared according to the method as described in Examples 1 and 2. This catalyst was used for butene-1 isomerization. The following table gives the results obtained:

TABLE II

| Run No. | Reactor Temp. | Butene-1 Feed Rate[a] | Product Analysis (% volume) | | |
|---|---|---|---|---|---|
| | | | Butene-1 | Butene-2-Trans | Butene-2-CIS |
| 7 | 130°C. | 20 ml/min | 45 | 33 | 22 |
| 8 | 150°C. | 20 ml/min | 22 | 52 | 26 |
| 9 | 170°C. | 20 ml/min | 17 | 71 | 32 |

[a]Gaseous butene-1 at atmospheric pressure.

As can be seen from the results as shown in Table II, substantial conversions to the butene-2 isomers are obtained with the catalyst system of this invention.

What is claimed is:

1. A process for isomerizing terminal aliphatic olefins having from two to 10 carbon atoms which comprises contacting said olefinic compounds with a heterogeneous catalyst, the preparation of which comprises: (1) impregnating a support with a nonaqueous solution of a soluble transition metal compound, the transition metal being selected from the group consisting of Group VIII metals and said support selected from the group consisting of oxides of Group II–V and VIB metals and carbon and silica; (2) reducing the impregnated support with an organometallic reducing agent of the formula $MR_n$ wherein M is a Group I through III metal, R is selected from the group consisting of hydrogen and $C_1 - C_{20}$ hydrocarbyl radicals and n is an integer of 1 through 3 equal to the valence of M, at a temperature of about ambient to 60° C.; (3) removing excess solvent and excess reducing agent, and (4) heating the product at a temperature of about 100° to 600° C. for at least about 0.1 hour, the catalyst formation process being conducted under a substantially inert atmosphere and under anhydrous conditions.

2. The process of claim 1 wherein said olefinic compounds are selected from the group consisting of aliphatic and cyclic monoolefins, diolefins and polyolefins having from two to about 20 carbon atoms.

3. The process of claim 1 wherein the support is selected from the group consisting of oxides of Group II, IIIA and IVB metals.

4. The process of claim 1 wherein the soluble transition metal compound is cobalt acetyl acetonate.

5. The process of claim 1 wherein the reducing agent has the formula: $AlR'_3$ wherein R' is selected from the group consisting of $C_1 - C_{20}$ hydrocarbyl radicals and hydrogen and at least one R' is a hydrocarbyl radical.

6. A process for isomerizing 5-alkenylbicycloheptenes having the following formula:

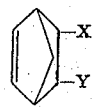

wherein X is an alkenyl radical having from two to about six carbon atoms and Y is hydrogen or an alkyl radical having from one to about four carbon atoms, to 5-alkylidinebicycloheptenes which comprises contacting said 5-alkenylbicycloheptenes with a catalyst, the preparation of which comprises: (1) impregnating a support with a nonaqueous solution of a soluble transition metal compound, the transition metal being selected from the group consisting of Group VIII metals and said support selected from the group consisting of oxides of Group II – V and VIB metals and carbon and silica; (2) reducing the impregnated support with an organometallic reducing agent of the formula $MR_n$ wherein M is a Group I through III metal, R is selected from the group consisting of hydrogen and $C_1 - C_{20}$ hydrocarbyl radicals and $n$ is an integer of 1 through 3 equal to the valence of M, at a temperature of about ambient to 60° C.; (3) removing excess solvent and excess reducing agent, and (4) heating the product at a temperature of about 100° to 600°C. for at least about 0.1 hour, the catalyst formation process being conducted under a substantially inert atmosphere and under anhydrous conditions.

7. The process of claim 6 wherein the support is selected from oxides of Groups II, IIIA and IVB metals.

8. The process of claim 6 wherein the transition metal compound is a Group VIII transition metal.

9. The process of claim 8 wherein the reducing agent has the formula: $AlR'_3$ wherein R' is selected from the group consisting of $C_1 - C_{20}$ hydrocarbyl radicals and hydrogen and at least one R' is a hydrocarbyl radical.

10. The process of claim 9 wherein each R' is a $C_1$ through $C_{12}$ alkyl radical.

11. The process of claim 10 wherein the reducing agent is trimethyl aluminum.

12. The process of claim 11 wherein the heating takes place for from about 0.1 to about 4.0 hours.

13. The process of claim 12 wherein said support is alumina and said soluble transition metal is cobalt acetyl acetonate.

14. The process of claim 13 wherein the isomerization reaction is carried out at a temperature ranging from about ambient to about 300° C.

15. The process of claim 14 wherein the catalyst is present in an amount ranging from about 1 to about 40 mole percent based on feed.

16. The process of claim 5 wherein X is a straight chained alkenyl radical having from two to about three carbon atoms and Y is hydrogen.

17. The process of claim 16 wherein the 5-alkenylbicycloheptene is a 5-vinylbicyclo[2.2.1]hept-2-ene and the 5-alkylidinebicycloheptene is 5-ethylidenebicyclo[2.2.1]hept-2-ene.

* * * * *